US007813381B2

(12) United States Patent
Chang et al.

(10) Patent No.: US 7,813,381 B2
(45) Date of Patent: Oct. 12, 2010

(54) AUTOMATIC DATA RATE DETECTION

(75) Inventors: Charles E. Chang, Coto de Caza, CA (US); Wim F. Cops, Newport Beach, CA (US); Brian Hostetter, Mission Viejo, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 991 days.

(21) Appl. No.: 10/841,762

(22) Filed: May 7, 2004

(65) Prior Publication Data

US 2005/0249126 A1 Nov. 10, 2005

(51) Int. Cl.
*H04J 3/06* (2006.01)
(52) U.S. Cl. ...................................... 370/503
(58) Field of Classification Search ................. 370/503
See application file for complete search history.

(56) References Cited

U.S. PATENT DOCUMENTS

| | | | | |
|---|---|---|---|---|
| 6,331,792 B1 * | 12/2001 | Tonietto | ...................... | 327/48 |
| 6,680,970 B1 * | 1/2004 | Mejia | ......................... | 375/225 |
| 6,901,127 B1 * | 5/2005 | Margules | .................... | 375/361 |
| 7,099,582 B2 * | 8/2006 | Belhadj-Yahya et al. | .... | 370/333 |
| 7,149,914 B1 * | 12/2006 | Asaduzzaman et al. | ..... | 713/500 |
| 7,212,600 B1 * | 5/2007 | Dauth | ......................... | 375/376 |
| 7,227,918 B2 * | 6/2007 | Aung et al. | ................. | 375/355 |
| 2001/0015839 A1 | 8/2001 | Koh et al. | .................... | 359/128 |
| 2002/0126784 A1 | 9/2002 | Brazeau et al. | ............. | 375/371 |
| 2003/0223520 A1 | 12/2003 | Kennedy et al. | ............ | 375/354 |
| 2004/0042544 A1 | 3/2004 | Mejia | ......................... | 375/225 |
| 2004/0052521 A1 * | 3/2004 | Halgren et al. | ................ | 398/19 |
| 2004/0052528 A1 * | 3/2004 | Halgren et al. | ................ | 398/75 |
| 2004/0076113 A1 * | 4/2004 | Aronson et al. | ............ | 370/217 |
| 2004/0114632 A1 * | 6/2004 | Yuuki et al. | ................. | 370/503 |
| 2005/0180536 A1 * | 8/2005 | Payne et al. | ................. | 375/354 |
| 2005/0281193 A1 * | 12/2005 | Hofmeister et al. | ......... | 370/217 |

OTHER PUBLICATIONS

PCT—Search Report and the Written Opinion of the International Searching Authority—Form PCT/ISA/220, 2005.

* cited by examiner

*Primary Examiner*—Anh-Vu Ly
(74) *Attorney, Agent, or Firm*—Thomas, Kayden, Horstemeyer & Risley, LLP.

(57) ABSTRACT

Various systems and methods for automatic data rate detection are provided. In one embodiment, a system is provided that includes a clock and data recovery circuit embodied in a first integrated circuit, the clock and data recovery circuit being configured to re-clock a data stream. The system also includes an automatic rate detection system embodied in a second integrated circuit, where the first integrated circuit is in data communication with the second integrated circuit. Also, the automatic rate detection system is configured to determine a data rate of the data stream upon identifying a transition in the data rate of the data stream based upon the state of the at least one status flag received from the clock and data recovery circuit.

12 Claims, 6 Drawing Sheets

AUTOMATIC DATA RATE DETECTION

BACKGROUND

In the video broadcasting industry, re-clocking of video data signals is performed to ensure the integrity of video data signals from source to destination on a video backplane or in other environments. In such environments, typically multiple video data signals of different data rates that are non-integer multiples of each other are used. Given that re-clocking of video data signals is often necessary to maintain signal integrity, the data rates of each of the data signals processed have to be determined so that re-clocking is performed at the data rate of a given video data signal.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
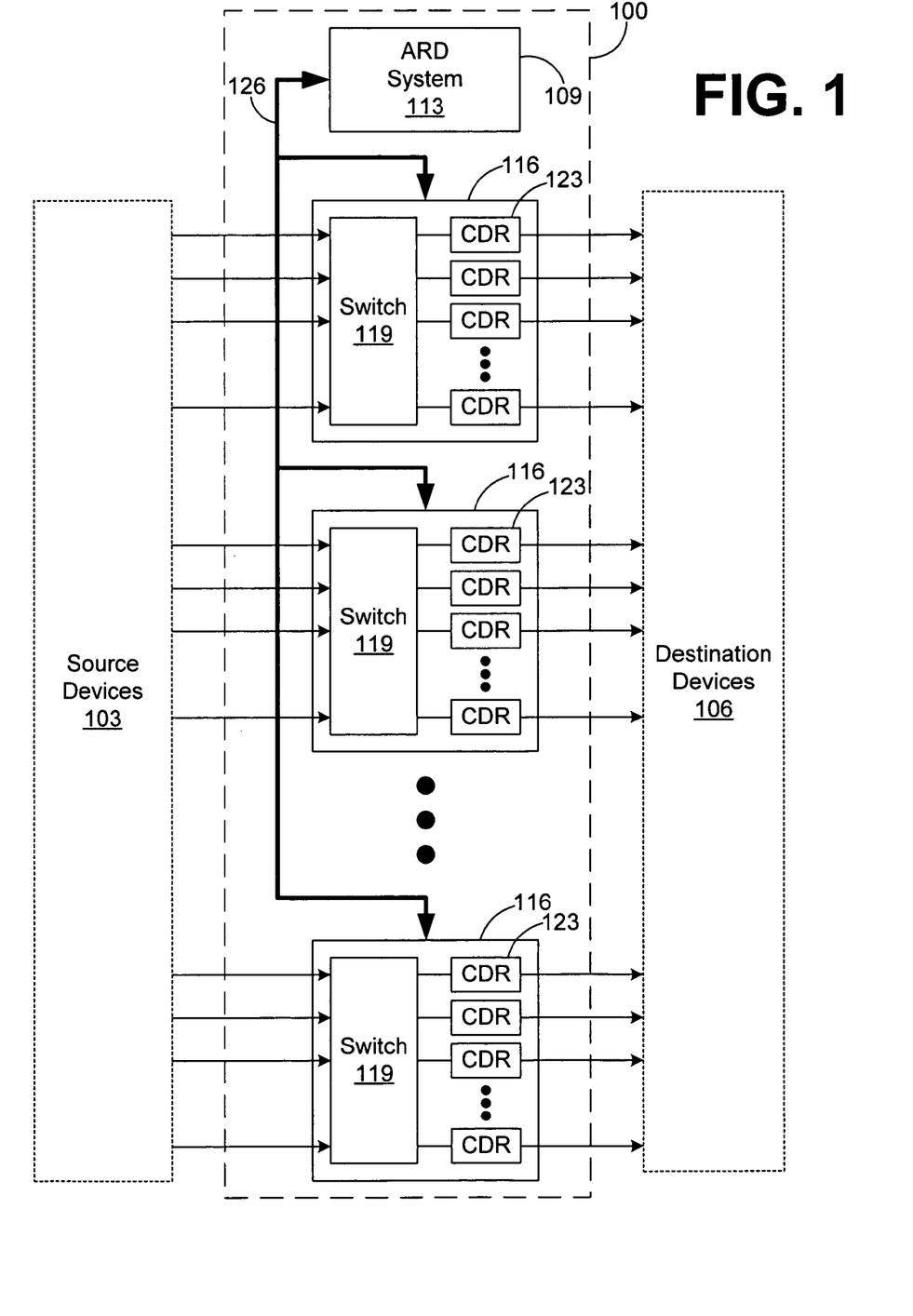
FIG. 1 is a schematic of a cross-point switch with integrated clock and data recovery circuits, for example, that embodies automatic data rate detection according to an embodiment of the present invention.

With reference to FIG. 1, shown is a cross-point switch 100 that embodies automatic data rate detection according to an embodiment of the present invention. The cross-point switch 100 facilitates switching for a number of data signals generated by any number of source devices 103 and transmitted to various destination devices 106. The source devices 103 may be, for example, video cameras, camcorders, computer graphics workstations, video server systems, and the like. Also, the destination devices 106 may comprise, for example, video monitors, routing switchers, distribution amplifiers, and the like.

In this respect, the cross-point switch 100 is a device that provides not only for switching, but for re-clocking of data signals to ensure the integrity of the video data embodied therein. The cross-point switch 100 may be employed, for example, in broadcast studio environments in which video signals are transmitted from various source devices 103 to various destination devices 106. The cross-point switch 100 provides one example of the use of automatic rate detection according to the present invention with respect to video data signals of different data rates that are routed by the cross-point switch 100. However, it can be appreciated that the automatic rate detection that is employed in conjunction with re-clocking of data as set forth herein may be used in devices other than the cross-point switch 100 as will be apparent.

In addition, the data signals processed may be data signals other than digital video data signals, where processing of digital video data signals are discussed herein as an example of one embodiment of the present invention. For example, the automatic rate detection as described herein may be employed in a clock and data recovery device such as those used, for example, in telecommunication or data communication equipment, stand-alone discrete re-clocking devices (single or multiple channels), as part of a clock recovery unit (CRU) block inside a deserializer (de-mux) device, or in conjunction with other devices.

With respect to the embodiment of FIG. 1, the cross-point switch 100 includes a first integrated circuit 109 within which is embodied an automatic rate detection system 113. The cross-point switch 100 also includes a number of second integrated circuits 116. Within each of the second integrated circuits 116 are a switch 119, for example, and a number of clock and data recovery circuits 123. In addition, other components may be included in the second integrated circuits 116 not pertinent to the discussion herein.

The first integrated circuit 109 is in data communications with each of the second integrated circuits 123 by way of a communications bus 126. In this respect, the communications bus 126 may be, for example, a serial bus, parallel bus, or other type data communications bus.

Each of the second integrated circuits 116 may include any number of clock and data recovery circuits 123 limited, for example, by the amount of area in the second integrated circuits 116, power capacity, and other such factors. Similarly, the cross-point switch 100 can include any number of the second integrated circuits 116 limited, for example, by the capacity of the automatic rate detection system 113 to perform automatic rate detection of video data signals processed by each one of the clock and data recovery circuits 123. In particular, any number of second integrated circuits 123 may be included up to the point that the automatic rate detection system 113 can provide for automatic rate detection for each of the clock and data recovery circuits 123 in a timely manner so as to be practicable.

Next, a general overview of the functionality of the various components of the cross-point switch 100 is provided. To begin, various units of the source devices 113 generate video data signals that are to be transported or routed to various units of the destination devices 106. In this respect, each of the source devices 103 may generate a video data signal at one of a number of data rates as are set forth by various digital video standards. For example, the data rates and applicable standards under which these video data signals are generated may be, for example, Standard Definition (SD) rates such as 143 Mbps, 177 Mbps, 270 Mbps, 360 Mbps, and 540 Mbps, or High Definition (HD) rates such as 1483 Mbps and 1485 Mbps. Also, such rates may include 2 times HD (2×HD) rates such as 2967 Mbps and 2870 Mbps. Also, non-serial video data rates may be employed. Other data rates include, but are not limited to, Fibre Channel (i.e. 1.0625 Gbps, 2.125 Gbps, or higher), SONET/SDH (i.e. 155 Mbps, 311 Mbps, 622 Mbps, 1244 Mbps, 2488 Mbps, or higher), Ethernet (i.e. 1250 Mbps, 2500 Mbps, or higher if applicable), or S-ATA (i.e. 1500 Mbps, 3000 Mbps, or 6000 Mbps).

Within each of the second integrated circuits 116, the switch 119 facilitates the routing of any one of the inputs to the switch 119 to any one of the clock and data recovery circuits 123 and the corresponding outputs of the second integrated circuit 116. Each of the clock and data recovery circuits 123 performs re-clocking of a data stream that is ultimately provided to a respective one of the destination devices 106. In this respect, the clock and data recovery circuits 123 extract the clock from the incoming serial bit stream, align the extracted clock to the incoming serial bit stream, and then retime the incoming data with the extracted clock before they are transmitted to the respective destination devices 106. In doing so, the clock and data recovery circuits 123 perform such re-timing functions as correction of duty cycle and/or correction of distortion due to inter-symbol interference (ISI), noise, and other conditions.

Each of the clock and data recovery circuits 123 processes a single data stream at a given time that may comprise any one of the various video data signals or other type of data signals. In this respect, each clock and data recovery circuit 123 recognizes only that a data stream is to be re-clocked. They do not recognize the nature of the data signal embodied in the data stream at a given time. In this respect, each of the clock and data recovery circuits 123 do not recognize if the data stream that they process has been switched from a first one of the data signals to a second one of the data signals. The data signals processed as the respective data streams by the clock and data recovery circuits at a given time are transmitted to respective destination devices 106.

Given that different source devices 103 may generate video data signals at different data rates as described above, it may be the case that a particular clock and data recovery circuit 123 may be performing re-clocking functions on a data stream comprising a video data signal from a first source device 103 at a first data rate and then suddenly a different video data signal is fed to the clock and data recovery circuit 123 from a second source device 103 at a second data rate that differs from the first data rate. In such case, the clock and data recovery circuit 123 is likely to experience a loss of phase and frequency lock and an inability to perform proper re-clocking functions due to the fact that, from the perspective of the clock and data recovery circuit, the data stream has experienced a transition in the data rate.

If the data rate of the data stream processed by a particular clock and data recovery circuit 123 has experienced a transition, then the automatic rate detection system 113 determines the new data rate of the data stream that embodies the subsequent video data signal processed by the respective clock and data recovery circuit 123. In order to determine whether one or more of the clock and data recovery circuits 123 needs to be reconfigured to perform re-clocking functions at a different data rate, the automatic rate detection system 113 obtains status flags associated with the operation of the clock and data recovery circuits 123.

In this respect, each of the second integrated circuits 116 includes a status register that includes status flags that indicate the particular state of each of the clock and data recovery circuits 123 residing thereon. In one embodiment, one of the status flags is a "Loss-of-Lock" flag that indicates whether the clock and data recovery circuit 123 currently has a phase lock on the respective data stream for which it is performing re-clocking functions. Also, another one of the status flags may be a "Loss of Activity" flag that indicates that a change in the transition density of the data stream processed by the clock and data recovery circuit 123 has been detected. The transition density refers to the rate of the number of transitions from high to low and vice versa. The transition density may be determined, for example, by detecting the number of "edges" in the data stream during a predefined time window. A change in the transition density is determined, for example, using any one of a number of approaches such as, for example, searching for predefined patterns in the data stream or by some other approach, etc. A change in the transition density of the data stream may or may not indicate that a transition from a first video data signal to a second video data signal has occurred with respect to a given clock and data recovery circuit 123 as will be described.

The automatic rate detection system 113 periodically accesses the status registers in the second integrated circuits 116 to determine the current status of each of the clock and data recovery circuits 123. By obtaining the current state of the various status flags associated with each of the clock and data recovery circuits 123, the automatic rate detection system 113 may determine whether one or more of a clock and data recovery circuits 123 is currently unable to perform re-clocking functions with respect to a given data stream due to the fact that it has been configured for a previous data rate. If one or more clock and data recovery circuits 123 needs to be reconfigured for a new data rate, the automatic rate detection system 113 proceeds to determine the data rate of the current data stream processed by the respective clock and data recovery circuits 123. In this respect, the new data rate of the data stream processed by the respective clock and data recovery circuit 123 is thus determined upon identifying the fact that a transition has occurred in the data rate of the data stream processed by the respective clock and data recovery circuit 123.

In order to detect the data rate of the data stream that comprises the new video data signal, the automatic rate detection system 113 performs an iterative operation in which the clock and data recovery circuit 123 is repeatedly configured to re-clock the data stream at a succession of predefined data rates until the data clock recovery circuit 123 acquires a lock on the data stream. In this respect, acquiring a lock on the data stream is defined as being configured to perform re-clocking of the data stream at the actual data rate of the data stream such that a clock and data recovery circuit 123 is locked in both frequency and phase with the data stream. While the automatic rate detection system 113 is performing the process of determining a data rate of the data stream processed by a given clock and data recovery circuit 123, the data stream is passed through to the respective destination device 106, thereby bypassing the re-clocking functions of the particular clock and data recovery circuit 123.

The automatic rate detection function of the automatic rate detection system 113 is distributed among each of the clock and data recovery circuits 123. By virtue of the fact that each of the second integrated circuits 116 includes a number of clock and data recovery circuits 123, a significant savings of circuit board real estate is achieved as opposed to configurations in which each second integrated circuit 116 might include a single clock and data recovery circuit 123. Also, the present configuration provides for flexibility in that the automatic rate detection system 113 can accommodate any number of second integrated circuits 116 to the extent practicable. In this respect, the cross-point switch 100 may thus be configured for the respective application with the savings and cost in terms of the number of integrated circuits 116 that is employed. Specifically, the number of second integrated circuits 116 that is employed may be catered to the specific number needed in a given application.

Figure 2:
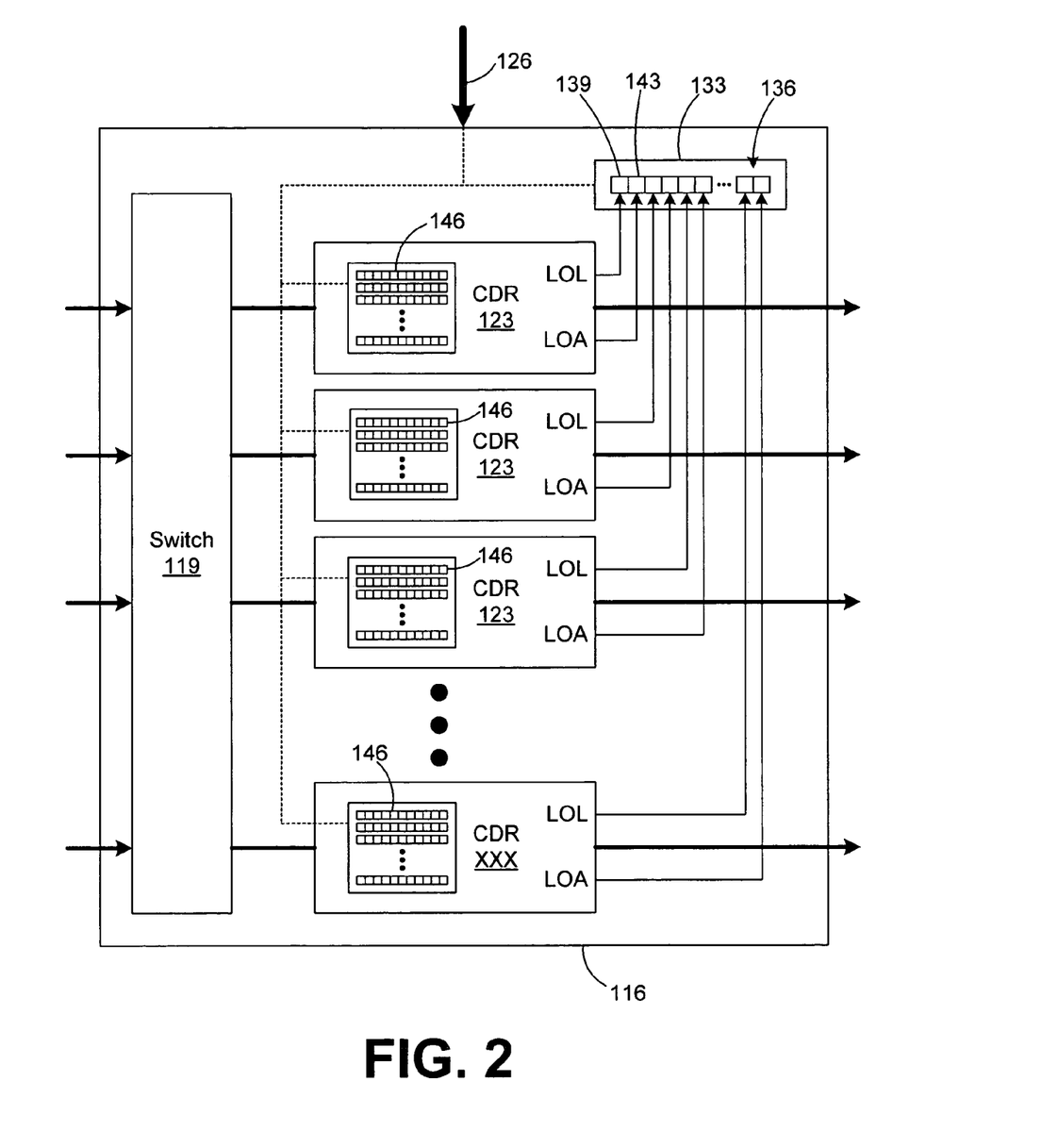
FIG. 2 is a schematic of an integrated circuit employed in the cross-point switch of FIG. 1 that includes a number of clock and data recovery circuits according to an embodiment of the present invention.

With reference to FIG. 2, shown is a schematic of one of the second integrated circuits 116 according to an embodiment of the present invention. As shown, the second integrated circuit 116 includes a status register 133. The status register 133 maintains a number of flags 136 with respect to each one of the clock and data recovery circuits 123. The flags 136 maintained within the status register 133 for each of the clock and data recovery circuits 123 may comprise, for example, a "Loss-of-Lock" flag 139, a "Loss of Activity" flag 143, or other type of flag. The Loss-of-Lock flag 139 indicates that the particular clock and data recovery circuit 123 has lost a phase and frequency lock on the data stream.

The Loss of Activity flag 143 indicates whether the clock and data recovery circuit 123 has detected that the transition density of the data stream processed thereby has changed beyond a predefined threshold. Given that the transition density of any data stream may vary over the period of transmission, it is possible that the Loss of Activity flag 143 might be erroneously triggered. For example, if the data signal experienced a number of consecutive logical "0's" or consecutive logical "1's" over a significant period of time, then the Loss of Activity flag 143 may be set with respect to the specific clock and data recovery circuit 123. The automatic rate detection system 113 provides for the determination as to whether a setting of the Loss of Activity flag 143 is due to an occurrence of a transition in the data rate of the data stream due to a switch from a first video data signal to a second video data signal, or is due to incidental data values in the video data signal itself as will be described. Specifically, the automatic rate detection system 113 maintains a count of each time the Loss of Activity flag 143 reappears after clearing the status register 133 on repeated occasions as will be described. Assuming that the count reaches a predefined Loss of Activity count threshold, then it is assumed that a transition from a first video data signal to a second video data signal has occurred. In this respect, the automatic rate detection system 113 ensures that action is taken to determine the data rate of the data stream only when the Loss of Activity flag 143 persists over time, indicating that a transition from a first video data signal to a second video data signal has occurred.

Each of the clock and data recovery circuits 123 includes a number of input registers 146. In order to configure a particular clock and data recovery circuit 123 to perform re-clocking operations at a predefined data rate, the automatic rate detection system 113 writes predefined values to the input registers 146. These values may comprise, for example, data rate divider values that divide down a voltage-controlled oscillator (VCO) frequency to the desired data rate, VCO comparison divider values that divide down the VCO to compare it with the divided down reference, and VCO trim values that are used to force the VCO course trim. These values may be, for example, hexadecimal values are unique to each target data rate.

Figure 3:
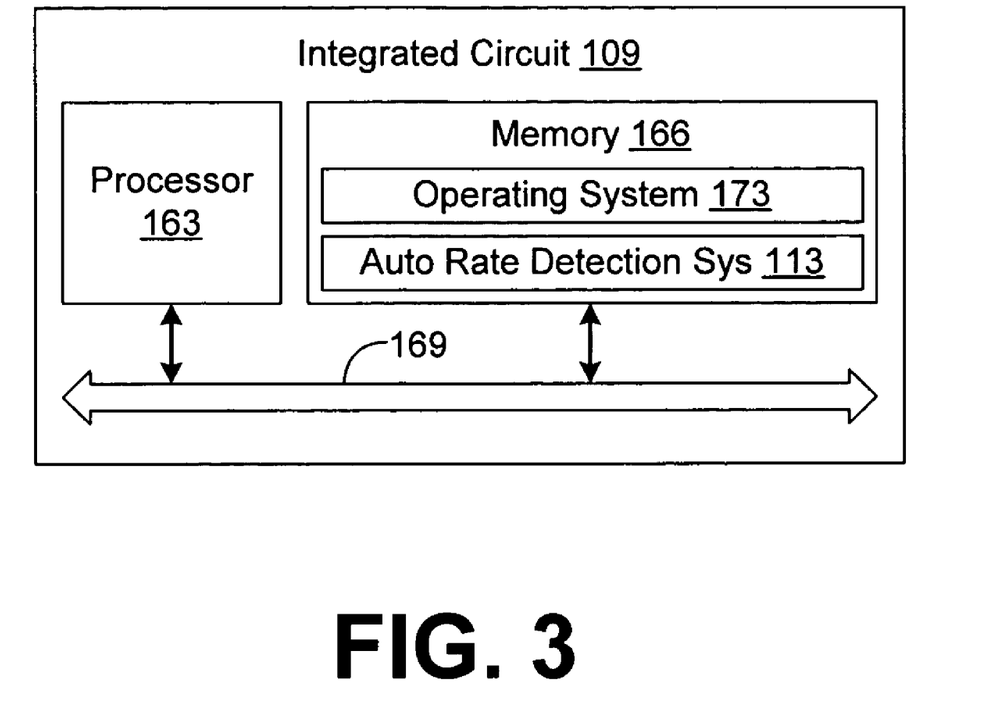
FIG. 3 is a schematic of a processor circuit that provides one example of an automatic data rate detection system employed in the cross-point switch of FIG. 1 according to an embodiment of the present invention.

With reference to FIG. 3, shown is a schematic of one example of the first integrated circuit 109 according to an embodiment of the present invention. In this embodiment, the integrated circuit 109 comprises a processor circuit having a processor 163 and a memory 166, both of which are coupled to a local interface 169. In this respect, the local interface 169 may comprise, for example, a data bus with an accompanying control/address bus as can be appreciated by those with ordinary skill in the art. Stored in the memory 166 and executable by the processor 163 are an operating system 173 and the automatic rate detection system 113 according to one embodiment of the present invention.

While the embodiment shown with reference to FIG. 3 depicts an implementation of the automatic rate detection system 113 according to an embodiment of the present invention. As shown in FIG. 3, the automatic rate detection system 113 is in the form of software or firmware that is executable by the processor 163 so as to ensure that each of the clock and data recovery circuits 123 (FIG. 1) is properly configured to re-clock their respective data streams at their respective data rates as described above. While the automatic rate detection system 113 is described as being implemented in the form of software or firmware in FIG. 3, it is understood that the automatic rate detection system 113 may also be embodied in the form of hardware such as, for example, a digital logic circuit. Alternatively, the automatic rate detection system 113 may be implemented using a combination of software/firmware and hardware. For example, the automatic rate detection system 113 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

In addition, the memory 166 is defined herein as both volatile and nonvolatile memory and data storage components. Volatile components are those that do not retain data values upon loss of power. Nonvolatile components are those that retain data upon a loss of power. Thus, the memory 166 may comprise, for example, random access memory (RAM), read-only memory (ROM), or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 163 may represent multiple processors and the memory 166 may represent multiple memories that operate in parallel. In such a case, the local interface 169 may be an appropriate network that facilitates communication between any two of the multiple processors, between any processor and any one of the memories, or between any two of the memories etc. The processor 163 may be of electrical, optical, or molecular construction, or of some other construction as can be appreciated by those with ordinary skill in the art.

Figure 4:
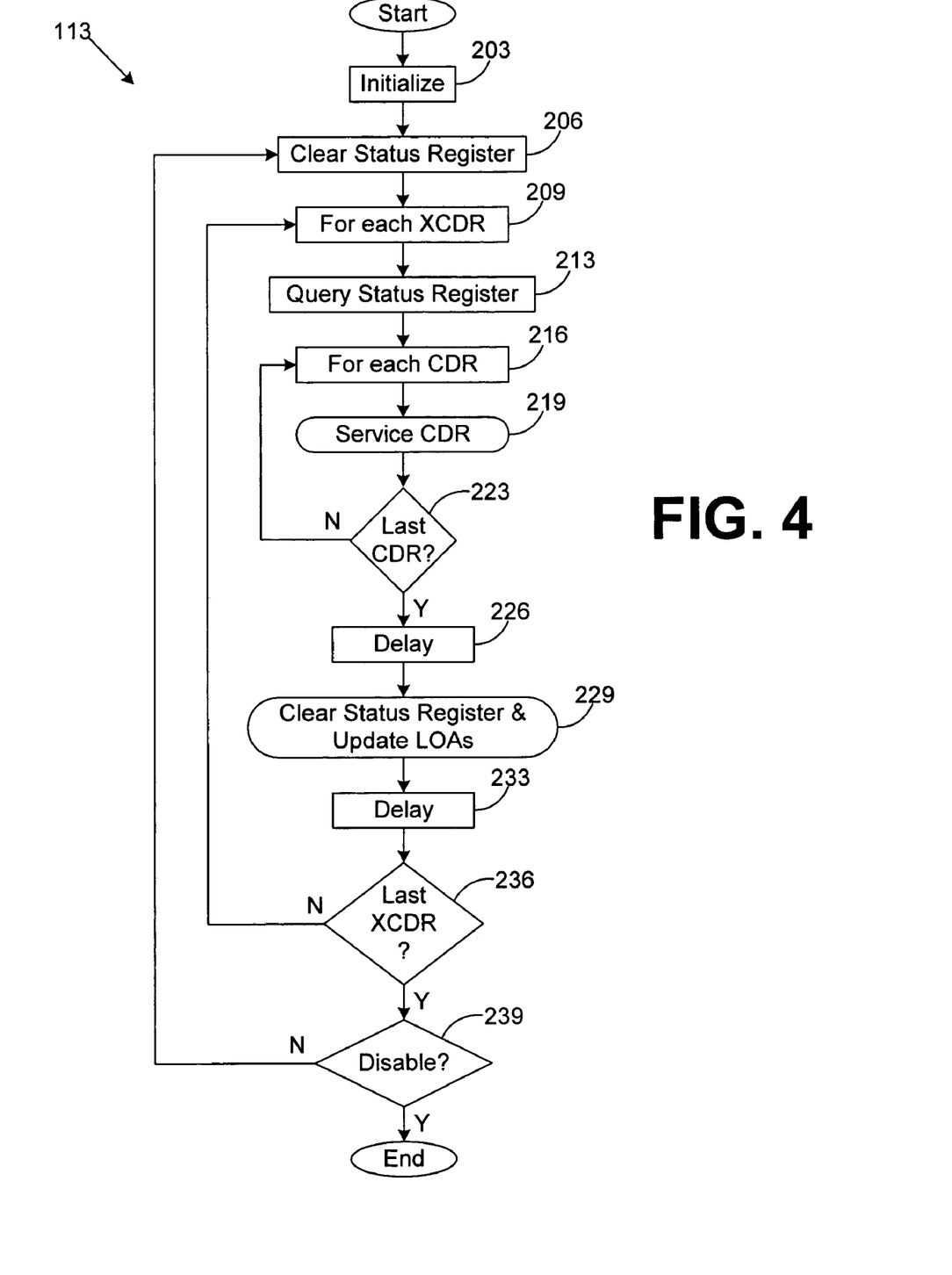
FIG. 4 is a flow chart that illustrates one example of the functionality of a first portion of the automatic data rate detection system of FIG. 3 according to an embodiment of the present invention.
Figure 5:
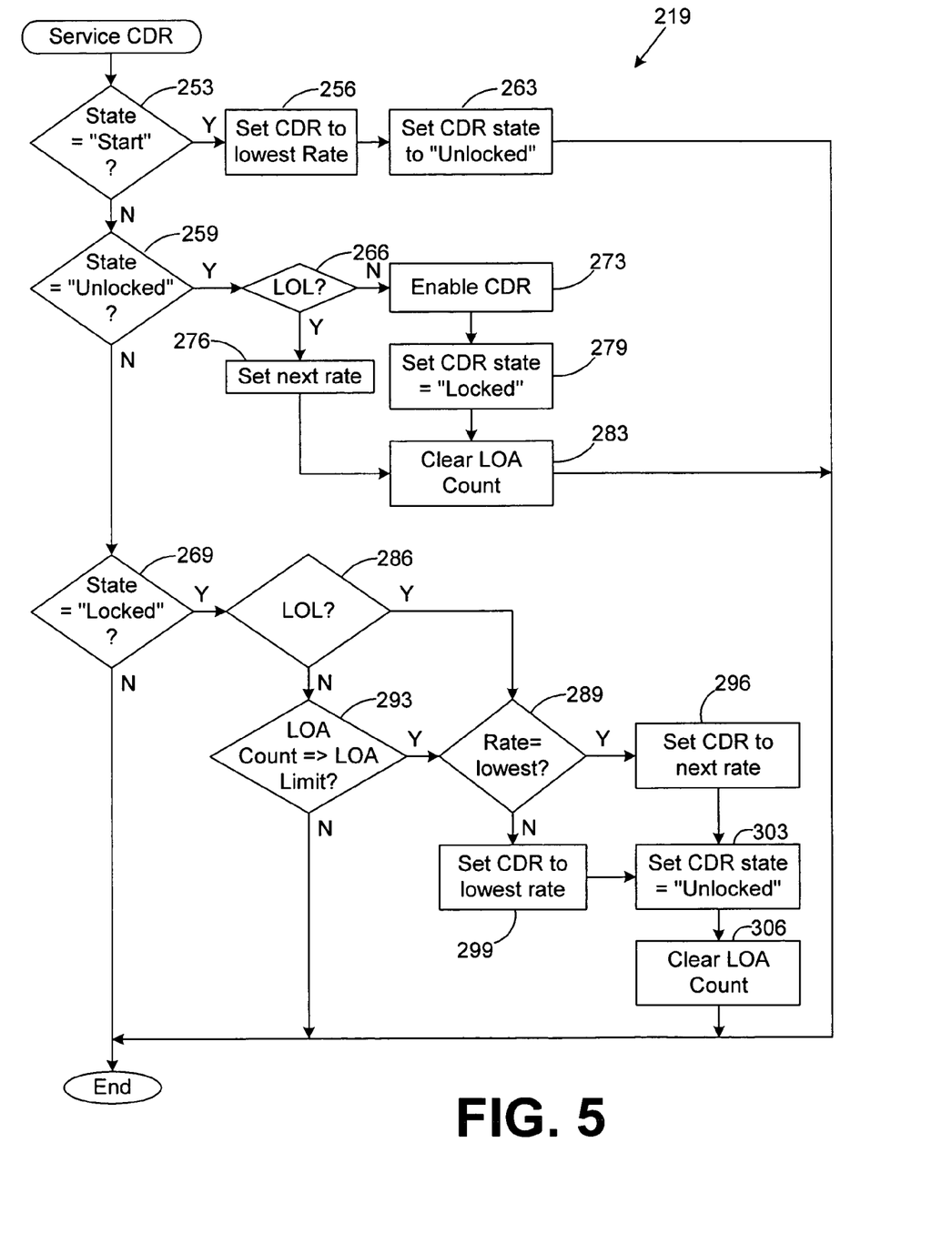
FIG. 5 is a flow chart that illustrates one example of the functionality of a second portion of the automatic data rate detection system of FIG. 3 according to an embodiment of the present invention.
Figure 6:
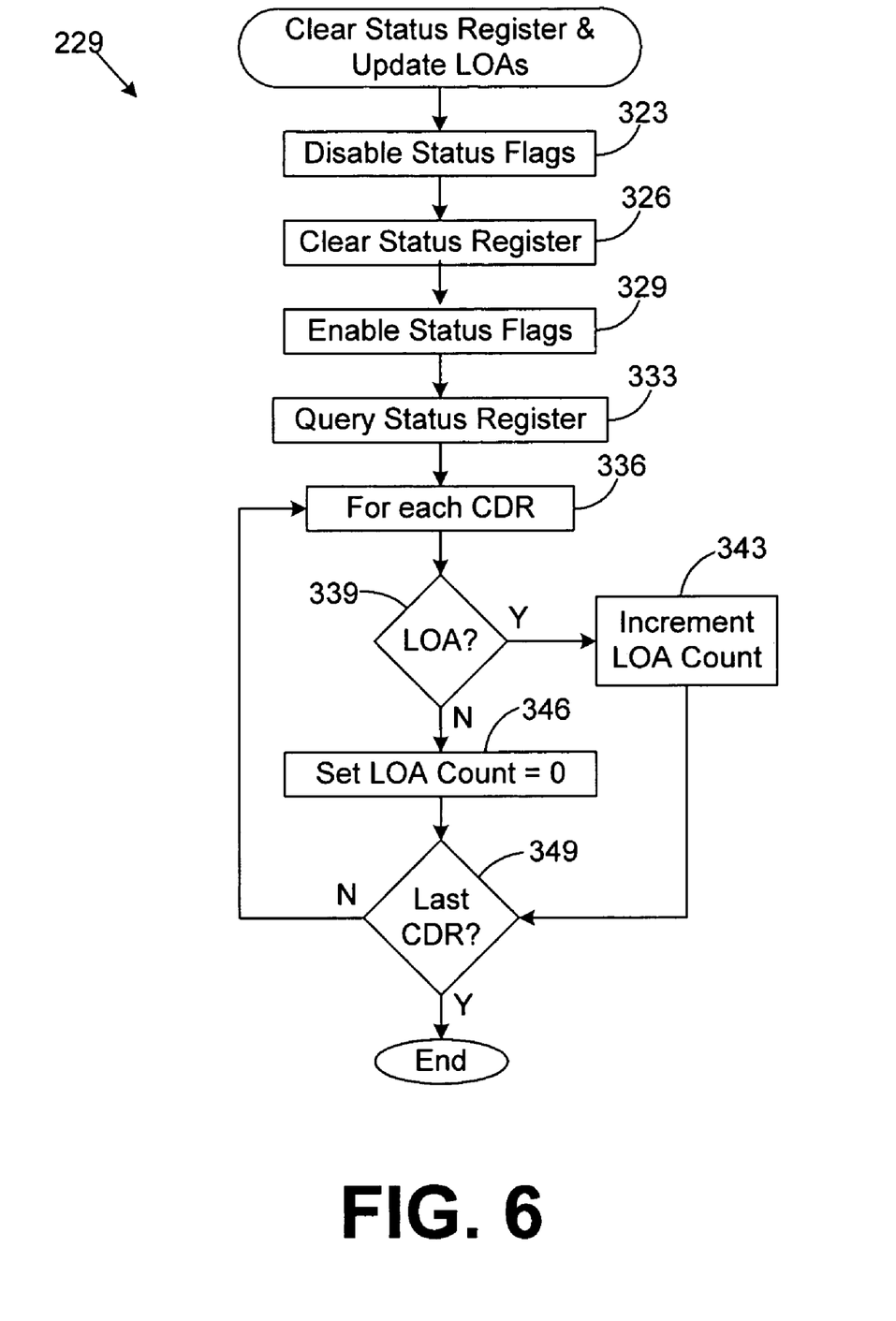
FIG. 6 is a flow chart that illustrates one example of the functionality of a third portion of the automatic data rate detection system of FIG. 3 according to an embodiment of the present invention.

Referring next to FIGS. 4, 5, and 6, shown are flow charts that provide one example of the operation of the automatic rate detection system 113 according to an embodiment of the present invention. Alternatively, the flow charts of FIGS. 4, 5, and 6 may be viewed as depicting steps of an example of a method implemented in the first integrated circuit 109 to provide for detection of data rates of video data signals processed by the clock and data recovery circuits 123. The functionality of the automatic rate detection system 113 as depicted by the example flow chart of FIGS. 4, 5, and 6 may be implemented, for example, in an object oriented design or in some other programming architecture. Assuming the functionality is implemented in an object oriented design, then each block represents functionality that may be implemented in one or more methods that are encapsulated in one or more objects. The automatic rate detection system 113 may be implemented using any one of a number of programming languages such as, for example, C, Assembly Language, or other programming languages.

With respect to FIG. 4, beginning with box 203, the automatic rate detection system 113 initializes its operation. In this respect, all variables and arrays associated with the operation of the automatic rate detection system 113 are placed in an initial state. For example, the automatic rate detection system 113 maintains a state variable for each of the client data recovery circuits 123 (FIG. 2). The state variable indicates whether the respective clock and data recovery circuit 123 is in a "start" state, an "unlocked" state, or a "locked" state as will be described. In the initialization step of box 203, these variables are all set to the "start" state.

Next, in box 206, the status register 133 (FIG. 2) is cleared. In this respect, all of the values associated with each of the status flags 136 (FIG. 1) including the Loss-of-Lock flags 139 (FIG. 2) and the Loss of Activity flags 143 (FIG. 2), are set, for example, to a logical "0" as can be appreciated. Then, in box 209, the automatic rate detection system 113 begins a processing loop for each one of the second integrated circuits 116 (FIG. 1) within the cross-point switch 100 or other device. Then, in box 213, the automatic rate detection system 113 queries the status register 133 to obtain values for each of the status flags 136 for the current integrated circuit 116. In response, the values of each of the status flags 136 are transmitted from the respective second integrated circuit to the automatic rate detection system 113 in the first integrated circuit. In this manner, the automatic rate detection system 113 is informed as to the current state of each of the Loss-of-Lock flags 139 and Loss of Activity flags 143 with respect to each of the clock and data recovery circuits 123 on the current second integrated circuit.

Thereafter, in box 216 the automatic rate detection system 113 begins a processing loop for each of the clock and data recovery circuits 123. Thereafter, in box 219 the automatic rate detection system 113 calls a service clock and data recovery circuit routine (hereafter "service CDR routine") that performs functions with respect to the current clock and data recovery circuit 123 identified in box 216 in the current loop. Thereafter, in box 223, the automatic rate detection system 113 determines whether the last clock and data recovery circuit 123 has been serviced as set forth by the loop defined in box 216. If so, then the automatic rate detection system 113 proceeds to box 226. Otherwise, the automatic rate detection system 113 reverts back to box 216.

Next, in box 226 the automatic rate detection system 113 implements a delay for a predefined period of time. This delay may be, for example, one millisecond or other appropriate delay in order to allow the Loss of Lock flag 143 time to de-assert if a clock and data recovery circuit has been successfully configured for the incoming data rate, or to re-assert if a clock and data recovery circuit has been configured for a data rate other than the actual data rate of the data stream processed thereby.

Thereafter, in box 236, the automatic rate detection system 113 determines whether the last second integrated circuit 116 has been processed. If not, then the automatic rate detection system 113 reverts back to box 209 as shown in order to process the clock and data recovery circuits 123 of the next second integrated circuit 116. Otherwise, the automatic rate detection system 113 proceeds to box 239 in which it is determined whether the function of the automatic rate detection system 113 itself is to be disabled. Such may be the case, for example, due to an error condition or an interrupt created by a user, etc. If the automatic rate detection system 113 is to proceed with operation, then the automatic rate detection system 113 reverts back to box 206. Otherwise, the function of the automatic rate detection system 113 ends as shown.

Turning to FIG. 5, shown is a flow chart that further illustrates the operation of the automatic rate detection system 113 according to an embodiment of the present invention. In particular, the service CDR routine 219 that is executed for each clock and data recovery circuit 123 is discussed. Beginning with box 253, the service CDR routine 219 determines whether the state of the current clock and data recovery circuit 123 considered is in a "start" state. This is determined by identifying the state variable associated with the current data recovery circuit 123 that is maintained by the automatic rate detection system 113 in the memory 166 (FIG. 3). Assuming the current clock and data recovery circuit 123 is in the "start" state, then the service CDR routine 219 proceeds to box 256. Otherwise, the service CDR routine 219 moves to box 259.

Assuming that the service CDR routine has proceeded to box 256, then the current clock and data recovery circuit 123 is configured to operate at the lowest of all of the possible data rates of the video data signals for which the clock and data recovery circuit 123 may be required to perform re-clocking operations. Thereafter, in box 263 the state associated with the current clock and data recovery circuit 123 is set to "unlocked". Thereafter, the service CDR routine 219 ends.

Assuming that the service CDR routine 219 has proceeded to box 259, then it is determined whether the current state of the current clock and data recovery circuit 123 is "unlocked". Assuming such is the case, then the service CDR routine 219 proceeds to box 266. Otherwise, the service CDR routine 219 proceeds to box 269. In box 266, the service CDR routine 219 determines whether there is a Loss-of-Lock flag 139 that has been set high (i.e. a logical "1") relative to the current clock and data recovery circuit 123 indicating that the current clock and data recovery circuit 123 has lost a phase lock on the data stream that it is processing. If not, then the service CDR routine 219 proceeds to box 273. Otherwise, the service CDR routine 219 progresses to box 276.

If the Loss-of-Lock flag 139 is not set high as determined in box 266, then the service CDR routine 219 proceeds to box 273 in which the operation of the clock and data recovery circuit 123 is enabled. This is done as it is apparent that the clock and data recovery circuit 123 has in fact locked on to the data stream and can now perform the re-clocking functions of the video data signal embodied therein as desired. Next, in box 279, the service CDR routine 219 sets the state of the current clock and data recovery circuit 123 to a "locked" state. Thereafter, the service CDR routine 219 proceeds to box 283.

With reference back to box 276, assuming that the Loss-of-Lock flag 139 is detected in box 266, then in box 276 the service CDR routine 219 reconfigures the clock and data recovery circuit 123 to operate at the next highest data rate that is possible among the predefined data rates for the video data signals processed as the data streams by the clock and data recovery circuits 123. In this respect, the automatic rate detection system 113 iteratively configures the clock and data recovery circuit 123 to re-clock the data stream in an ascending order of the predefined data rates associated with the predefined video data signals that may be included as the data stream itself. That is to say, each time the clock and data recovery circuit 123 is processed by the service CDR routine 219 and is in the unlocked state, then the automatic rate detection system 113 iteratively reconfigures the clock and data recovery circuit 123 to operate at the next highest data rate until a Loss-of-Lock flag 139 is no longer experienced. Once the clock and data recovery circuit 123 has been configured for the next highest data rate in box 276, then the service CDR routine 219 proceeds to box 283.

In box 283, a "Loss of Activity" count (hereafter "LOA count") maintained by the automatic rate detection system 113 is cleared. The LOA count is maintained to ensure that a Loss of Activity flag 143 set high in the status register 133 of a respective second integrated circuit 116 actually represents a transition from one data rate to another data rate in the data stream processed by a respective clock and data recovery circuit 123 as will be described. Thereafter, the service CDR routine 219 ends as shown.

With respect to box 269, if the service CDR routine 219 determines that the state of the current clock and data recovery circuit 123 is "locked", then the service CDR routine 219 proceeds to box 286. Otherwise, the service CDR routine 219 ends. Assuming the service CDR routine 219 proceeds to box 286, then it determines whether there is a Loss-of-Lock flag 139 associated with the current clock and data recovery circuit 123 set high (i.e. set to a logical "1") or other appropriate state. Assuming that the Loss-of-Lock flag 139 is set high, then the service CDR routine 219 proceeds to box 289. Otherwise, the service CDR routine 219 progresses to box 293.

In box 293, the service CDR routine 219 determines whether the LOA count discussed in box 283 is greater or equal to a predefined Loss of Activity threshold or limit. In this respect, the service CDR routine 219 determines whether a high Loss of Activity flag 143 has persisted through a number of examinations of a specific clock and data recovery circuit 123 on the part of the automatic rate detection system 113. Assuming that the LOA count is less than the predefined Loss of Activity limit in box 293, then the service CDR routine 219 ends. Otherwise, the service CDR routine 219 proceeds to box 289.

Thus, in box 286, the Loss-of-Lock flag 139 indicates whether the clock and data recovery circuit 123 examined has lost phase lock on the data stream. Once such a condition is detected while the clock and data recovery circuit 123 is in a locked state, then it is assumed that the data stream processed by the current clock and data recovery circuit 123 has experienced a switch from a first one of the video data signals to a second one of the video data signals, thereby resulting a transition from a first data rate to a second data rate. In such case, then the automatic rate detection system 113 needs to determine the new data rate of the data stream processed by the clock and data recovery circuit 123.

Assuming that the service CDR routine 219 has proceeded to box 289, then the service CDR routine 219 determines whether the current clock and data recovery circuit 123 is configured to re-clock at the lowest possible data rate of all of the possible data rates of the video signals processed. If such is the case, then the service CDR routine 219 proceeds to box 296. Otherwise, the service CDR routine 219 progresses to box 299.

In box 296, the service CDR routine 219 configures the clock and data recovery circuit 123 to perform re-clocking operations at the next highest data rate. This is done since the clock and data recovery circuit 123 has already lost its lock on the data stream at the lowest data rate as determined in box 289. Thus, there is no need to reconfigure the clock and data recovery circuit 123 to operate at the lowest data rate to attempt to acquire the data stream for re-clocking functions. Thereafter, the service CDR routine 219 proceeds to box 303.

Assuming that the clock and data recovery circuit 123 is not configured to perform re-clocking at the lowest possible data rate in box 289, then the service CDR routine 219 proceeds to box 299 in which the clock and data recovery circuit 123 is set to perform re-clocking at the lowest data rate. Then, the service CDR routine 219 proceeds to box 303.

In box 303, the service CDR routine 219 sets the state of the current clock and data recovery circuit 123 to "Unlocked". In this respect, it is ultimately been determined that the current clock and data recovery circuit 123 has lost the lock on to the data stream. Thereafter, in box 306, the LOA count is cleared. In this respect, the LOA count is set equal to zero as the Loss-of-Lock on the respective data stream has already been detected. Thereafter, the service CDR routine 219 ends.

Turning to FIG. 6, shown is a flow chart that further illustrates the operation of the automatic rate detection system 113 according to an embodiment of the present invention. In particular, the routine 229 that is executed to clear the status register 133 (FIG. 2) and to update the LOA counts as will be described. Beginning with box 323, the routine 229 disables the status flags 136 (FIG. 2) in the status register 133. In this respect, the clock and data recovery circuits 123 (FIG. 2) are prevented from updating the status flags 136 in the status register 133. This is done to determine whether a current Loss of Activity flag 143 (FIG. 2) will persist indicating that it's possible that a transition in the data rate of the data stream has occurred.

Thereafter, in box 326, a status register 133 is cleared. In this respect, all states of each of the status flags 136 are set low (i.e. to a logical "0") or other appropriate value. Next, in box 329, the status register 133 is enabled thereby allowing each of the clock and data recovery circuits 123 associated with the current second integrated circuit 116 to write values to the status register 133 for the respective status flags 136. Then, in box 333, the routine 229 queries the status register 133 to obtain current values for each of the status flags 136. This information is communicated to the automatic rate detection system 113 over the communications bus 126 (FIG. 1).

Next, in box 336, the routine 229 begins a loop for each of the clock and data recovery circuits 123 in the current second integrated circuit 116. In box 339, it is determined whether a Loss of Activity flag 143 exists with respect to the current clock and data recovery circuit 123. If so, then the routine 229 proceeds to box 343. Otherwise, the routine 229 progresses to box 346.

In box 343, the routine 229 increments the corresponding LOA count with respect to the current clock and data recovery circuit 123, thereby maintaining a count of the number of occurrences that the Loss of Activity flag 143 is set high. Thereafter, the routine 229 proceeds to box 349. Assuming however that the Loss of Activity flag 143 has not been set in box 339, then in box 346 the LOA count is set to zero. This is due to the fact that if no Loss of Activity flag 143 is set in box 339, then the LOA count should be set to zero. This is because if the LOA count was greater than zero at such time, it would be apparent that such an occurrence was due to a transient effect in the data that caused the Loss of Activity flag 143 rather than being due to a transition in the data rate of the data stream due to a switch from one video data signal to another. In this respect, the routine 229 determines whether a change in the transition density of the data stream processed by a given clock and data recover circuit 123 is due to an actual change in the data rate of the data stream processed thereby.

In box 349, it is determined whether the last clock and data recovery circuit 123 has been examined in the current loop. If not, then the routine 229 reverts back to box 336. Otherwise, the routine ends as shown.

Although the flow charts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the automatic rate detection system 113 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the automatic rate detection system 113 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method for data rate detection using an automatic rate detection system embodied in first integrated circuit to detect a data rate of a data stream processed by a clock and data recovery circuit embodied in second integrated circuit, comprising the steps of:
    re-clocking the data stream with the clock and data recovery circuit;
    maintaining at least one status flag with the clock and data recovery circuit;
    communicating the state of the at least one status flag from the clock and data recovery circuit in the second integrated circuit to the automatic rate detection system in the first integrated circuit;
    determining a data rate of the data stream with the automatic rate detection system upon identifying a transition in a data rate of the data stream based upon the state of the at least one status flag;
    indicating whether a change in the transition density of the data stream is detected with the at least one status flag; and
    determining when a change in the transition density of the data stream as indicated by the state of the status flag is due to an actual change in the data rate of the data stream by:
        maintaining a count of a number of occurrences of a high state of the status flag; and
        determining the data rate of the data stream if the count is at least as great as a predefined threshold.

2. The method of claim 1, wherein the data stream comprises any one of a plurality of data signals at a given time, the method further comprising the step of switching the data stream from a first one of the data signals to a second one of the data signals, thereby causing the transition in the data rate of the data stream.

3. The method of claim 1, wherein the step of determining the data rate of the data stream further comprises iteratively configuring the clock and data recovery circuit to re-clock the data stream at a succession of predefined data rates until the clock and data recovery circuit acquires a lock on the data stream.

4. The method of claim 3, wherein the data stream further comprises one of a predefined number of data signals, each of the data signals operating at one of the predefined data rates, the method further comprising the step of iteratively configuring the clock and data recovery circuit to re-clock the data stream in an ascending order of the predefined data rates.

5. The method of claim 1, wherein the transition in the data rate of the data stream is identified by determining if the state of at least one status flag indicates that the clock and data recovery circuit has lost the phase lock on the data stream.

6. A system for automatic data rate detection, comprising:
    a clock and data recovery circuit embodied in a first integrated circuit, the clock and data recovery circuit being configured to re-clock a data stream, the data stream comprises any one of a plurality of data signals at a given time, and the transition in the data rate of the data stream is caused by switching the data stream from a first one of the data signals to a second one of the data signals;
    an automatic rate detection system embodied in a second integrated circuit;
    the first integrated circuit being in data communication with the second integrated circuit; and
    the automatic rate detection system being configured to determine a data rate of the data stream upon identifying a transition in the data rate of the data stream based upon a state of at least one status flag received from the clock and data recovery circuit, the at least one status flag indicating a change in a transition density of the data stream, the automatic rate detection system further configured to determine when a change in the transition density of the data stream as indicated by the state of the at least one status flag is due to an actual change in the data rate of the data stream; wherein,
    the automatic rate detection system maintains a count of a number of occurrences of a high state of the at least one status flag and, the automatic rate detection system determines the data rate of the data stream if the count is at least as great as a predefined threshold.

7. The system of claim 6, wherein the data stream comprises any one of a plurality of data signals at a given time, and the transition in the data rate of the data stream is caused by switching the data stream from a first one of the data signals to a second one of the data signals.

8. The system of claim 6, wherein the automatic rate detection system is further configured to iteratively configure the clock and data recovery circuit to re-clock the data stream at a succession of predefined data rates until the clock and data recovery circuit acquires a lock on the data stream.

9. The system of claim 6, wherein the automatic rate detection system assumes that the transition in the data rate of the data stream has occurred upon receiving the state of at least one status flag indicating that the clock and data recovery circuit has lost the phase lock on the data stream.

10. The system of claim 8, wherein the data stream further comprises one of a predefined number of data signals, each of the data signals operating at one of the predefined data rates.

11. The system of claim 10, wherein the automatic rate detection system iteratively configures the clock and data recovery circuit to re-clock the data stream in an ascending order of the predefined data rates.

12. The system of claim 6, wherein:
the second integrated circuit further comprises a processor circuit having a processor and a memory; and
the automatic rate detection system further comprises logic that is stored in the memory and is executable by the processor.

* * * * *